Patented Oct. 28, 1924.

1,513,690

UNITED STATES PATENT OFFICE.

ALBERT LOUIS BENOIT, OF OISTERWIJK, NETHERLANDS.

PROCESS FOR PURIFYING LIQUIDS.

No Drawing.    Application filed November 19, 1923. Serial No. 675,780.

*To all whom it may concern:*

Be it known that I, ALBERT LOUIS BENOIT, a citizen of the United States, residing at Oisterwijk, the Netherlands, have invented certain new and useful Improvements in a Process for Purifying Liquids, of which the following is a specification.

This invention relates to a process for making a purifying medium for liquids and to a process for purifying liquids more particularly waste waters.

Many disadvantages are experienced as is well known, in the proximity of various factories from the smell of the waste water which further forms a permanent menace to health. Many processes and apparatus have indeed already been proposed for this purpose but these have firstly not always attained the desired object and further they are expensive owing to the chemicals and apparatus used therein.

Now by this invention a cheap and easily obtainable purifying medium for liquids is produced by converting chrome leather into a finely divided form the almost valueless scraps of chrome leather being utilized, which are otherwise employed only to a limited extent in the glue industry.

According to the present invention chrome leather shavings or like scrap from the chrome leather industry are employed as filtration and adsorption material for purifying various liquids.

The manufacture of the purifying medium of this invention is carried out by the hides after being tanned being shaved or planed which is done with the appliances usually customary in tanneries. The still damp material is then dried in air, whereupon the separation of the pulverulent from the coarser portions is effected as simply as possible. The material is then employed in filters for instance in tanks, and the dark coloured, strong smelling water appears as pure water almost free from odour and taste. Small quantities of chrome are however still present in the water and therefore it is advisable when preparing drinking water to first purify the chrome leather scrap with water or chemical means. It has been found that a simple washing with dilute acetic acid, will attain the desired result but, of course, leaves chrome still in the leather, since use of chrome leather is essential to the invention. The scrap may also be mixed before use if desired with other decolorizing media such as decolorizing carbon, examples of which are highly activated carbon, such as known under the registered trademarks, norit, purit, eponit, etc. or used after or before such a medium and its activity increased by suitable treatment although this is generally unnecessary.

The improved purifying medium is also adapted for purifying other liquids and solutions, for example the improved medium may be employed for decolouring and purifying sugar juice, but it is of course necessary to subject the scrap to a preliminary purification.

In using chrome leather scrap as means for purifying the waste water of a chrome leather tannery, in which not only the waste water from the tannery but also that from the dye works is to be purified, it has been found that the above filtering material retains its decolourizing and cleansing action to a large extent even after four weeks' use, when the water flowed clear and odourless from the filter as at first. It may be of advantage however to stir up the material after longer use, whereby its action is again improved.

After long use a regeneration may if desired be adopted. After some time, e. g., 5 or 6 days, the filtering mass is shoveled in order to remove the clefts which may have formed in the filtering mass. Then the filtering mass is treated with water in order to remove impurities originating from the filtering process. The water used, together with the impurities, are then brought upon the filtering mass again, so that the filter is again ready for use.

I claim:

1. A process for purifying liquids comprising, filtering the liquids to be purified, through chrome leather scraps.

2. A process according to claim 1, the pulverulent parts of the scraps being separated from the coarser parts of the scraps prior to the filtering.

3. A process according to claim 1, the chrome leather scraps being preliminarily purified.

4. A process according to claim 1, the pulverulent parts of the scraps being separated from the coarser parts of the scraps, the chrome leather scraps being preliminarily purified by chemical means.

5. A process according to claim 1, the filtering through the chrome leather scraps be- 6. A process according to claim 1, the pulverulent parts of the scraps being separated from coarser parts of the scraps, the filtering through the chrome leather scraps being carried out in conjunction with any other known purifying medium.

7. A process according to claim 1, the chrome leather scraps being preliminarily purified, the filtering through the chrome leather scraps being carried out in conjunction with any other known purifying medium.

8. A process according to claim 1, the pulverulent parts of the scraps being separated from the coarser parts of the scraps, the chrome leather scraps being preliminarily purified by chemical means, and filtering through the chrome leather scraps being carried out in conjunction with any other known purifying medium.

9. A new article of manufacture, a filtering means, comprising, chrome leather shaving to claim 9, said shavings being purified.

10. A new article of manufacture, according to claim 9, said shavings being purified.

11. A new article of manufacture according to claim 9, said shavings being purified by chemical means.

In testimony whereof I affix my signature.

ALBERT LOUIS BENOIT.